Oct. 30. 1928.
A. DURESEN
MOTOR VEHICLE
Filed May 23, 1925
1,689,582
4 Sheets-Sheet 1
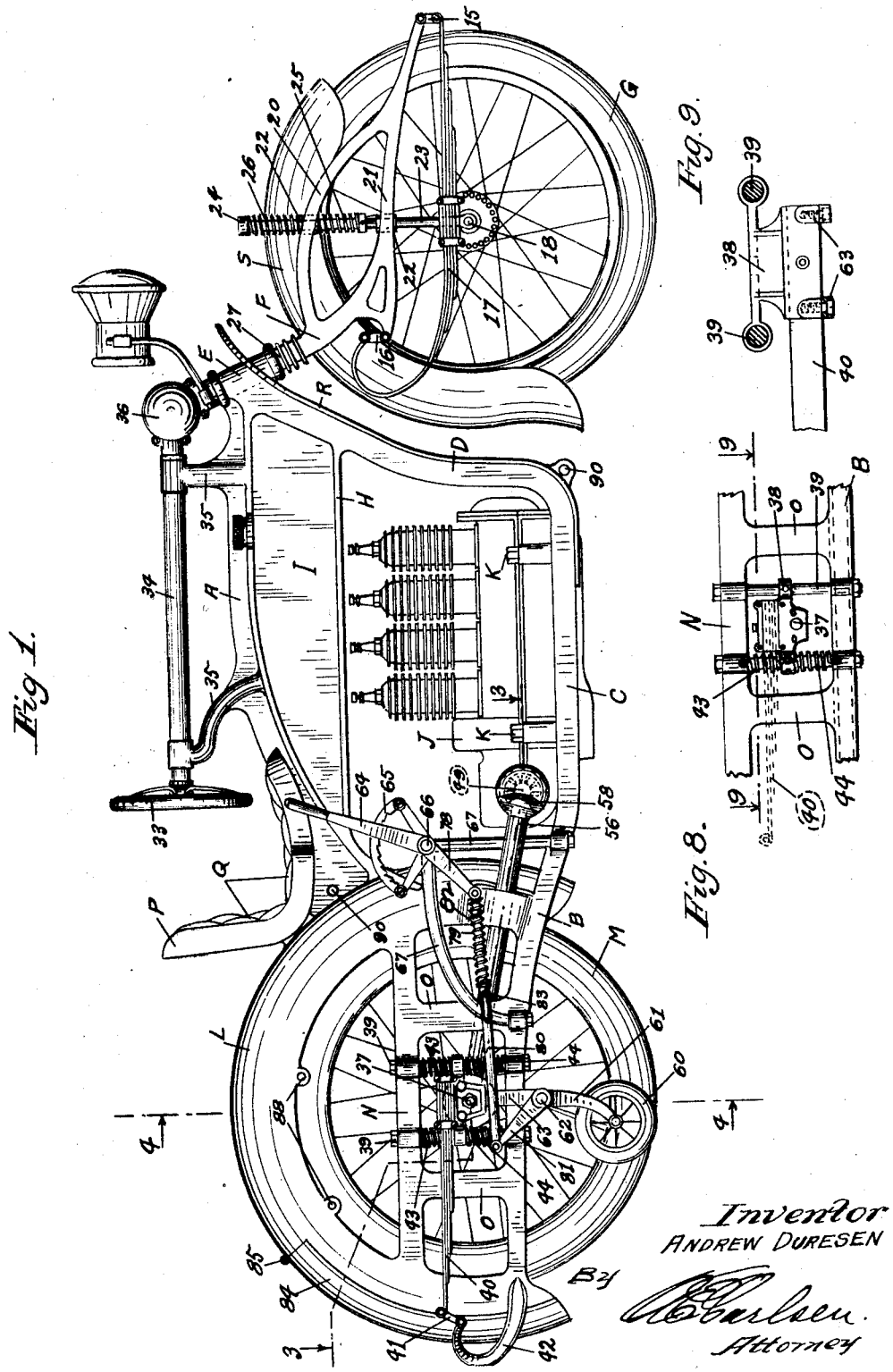
Inventor
ANDREW DURESEN
By
Attorney Oct. 30, 1928.
A. DURESEN
1,689,582
MOTOR VEHICLE
Filed May 23, 1925     4 Sheets-Sheet 2
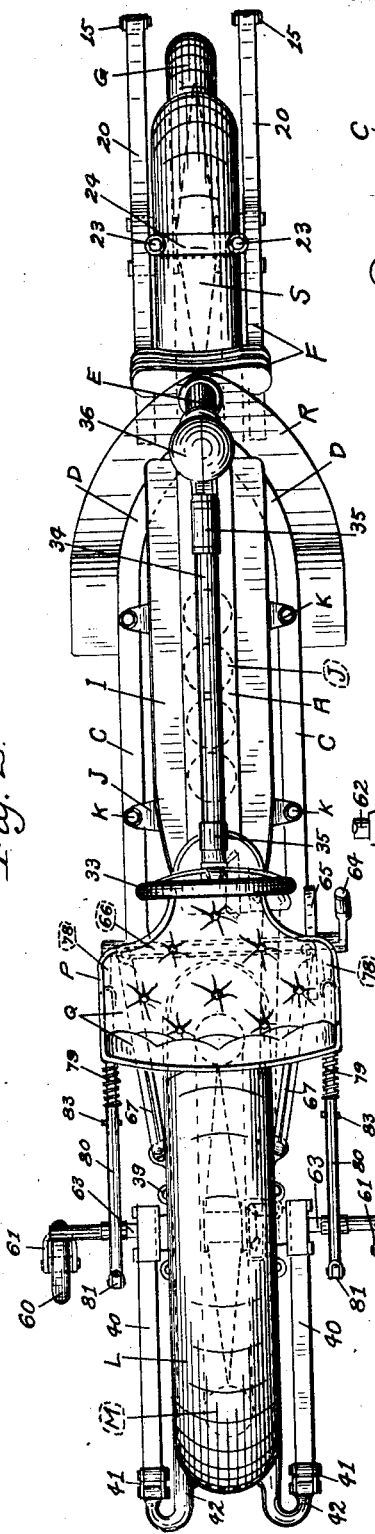
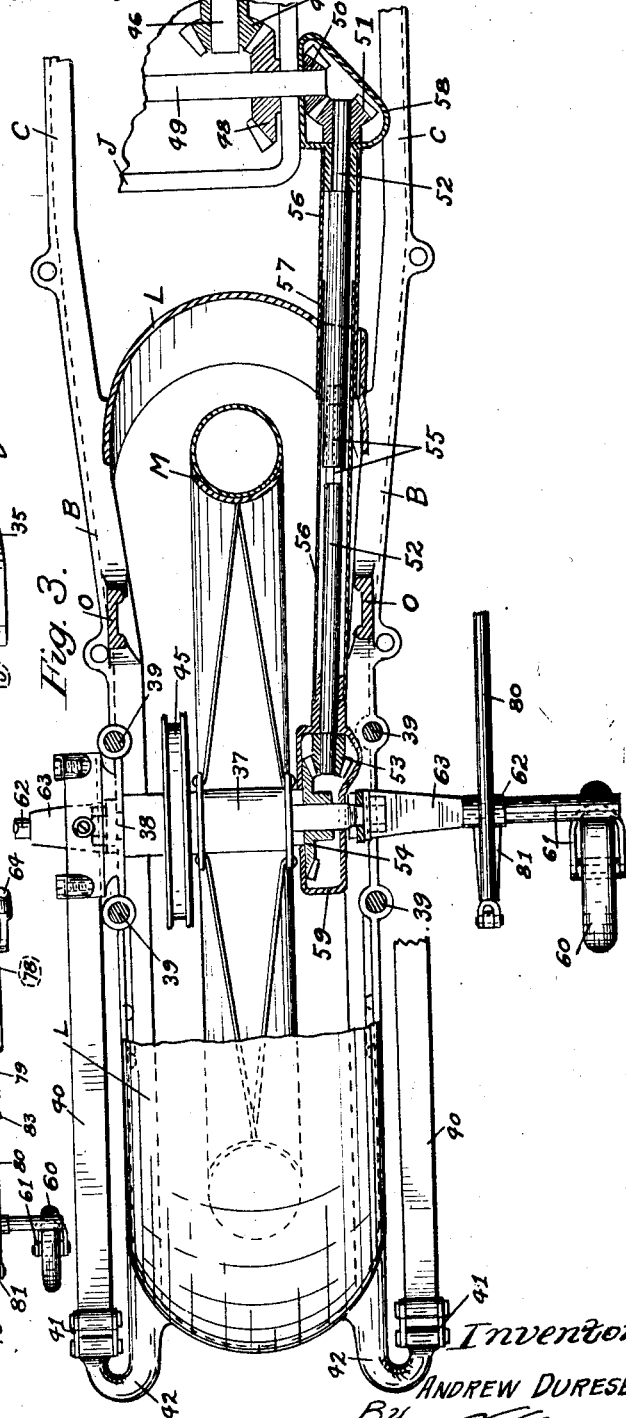
Inventor
ANDREW DURESEN
By
Attorney

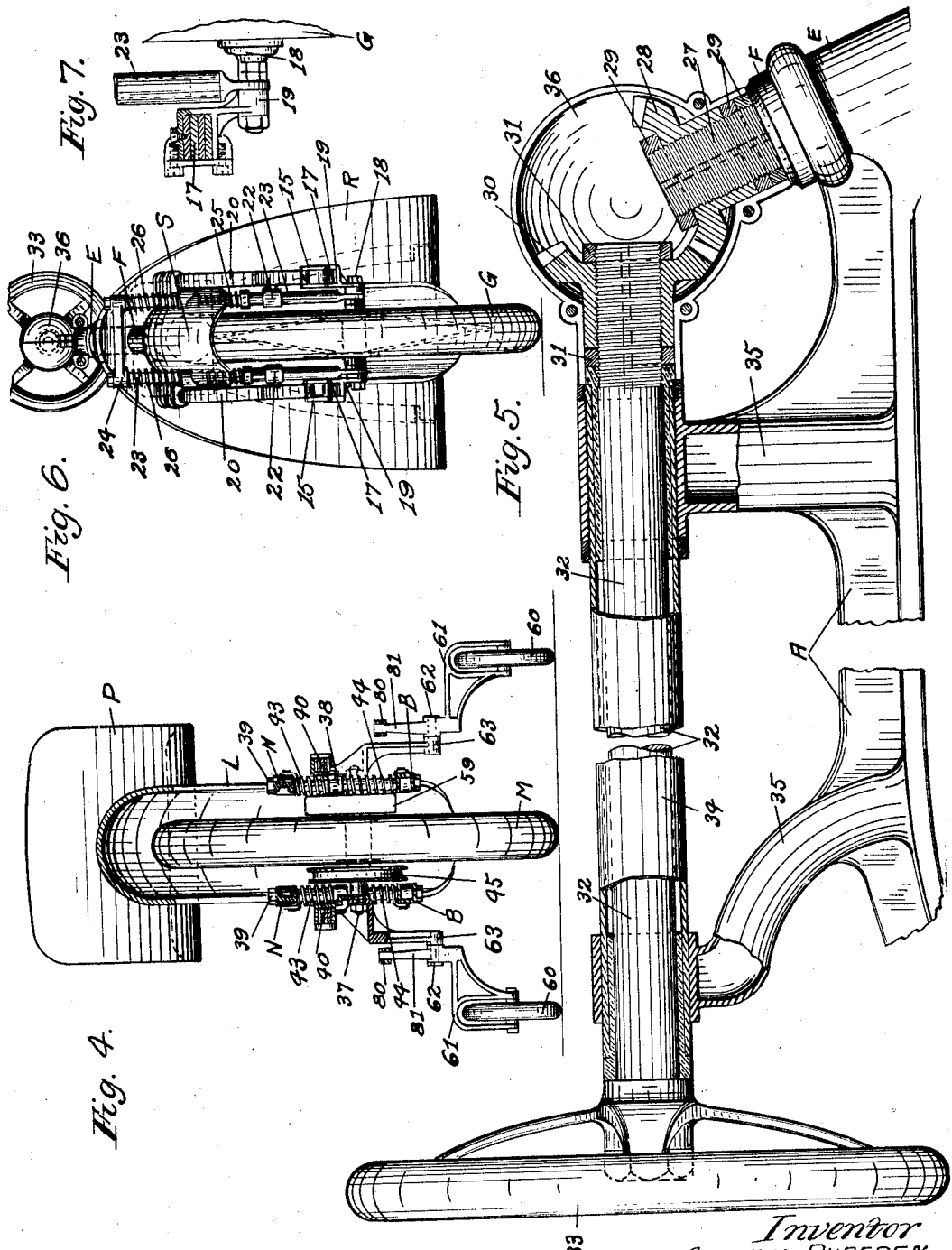

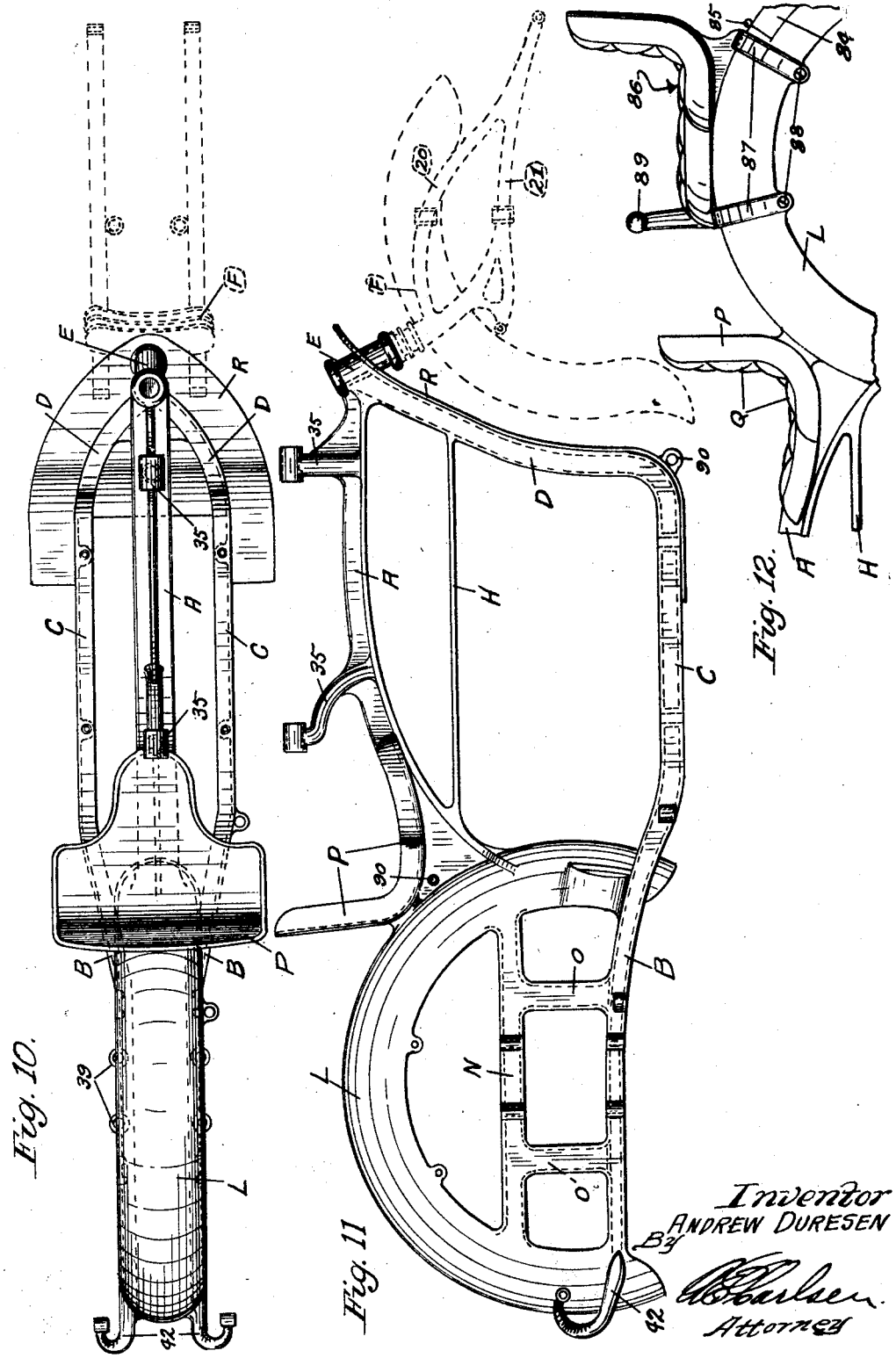

Patented Oct. 30, 1928.

1,689,582

UNITED STATES PATENT OFFICE.

ANDREW DURESEN, OF MINNEAPOLIS, MINNESOTA.

MOTOR VEHICLE.

Application filed May 23, 1925. Serial No. 32,515.

This invention relates to motor vehicles and the main object is to provide an improved vehicle, of the motor cycle type, in which is embodied a number of novel, and practical features of construction adapted to render the machine more efficient in operation, more economical in manufacturing cost, and more comfortable in riding qualities, than in other machines of the same type which have come to my knowledge. A further and more specific object is to provide a novel construction of main frame for the machine, which, being integrally formed in one casting insures rigidity and eliminates assembling expenses such as is required in machines having main frames made up of a large number of separately constructed parts. A further object is to provide a novel construction of steering mechanism which will be fully described in the following specification.

A further object is to provide highly efficient and practical means for mounting the wheels of the vehicle, such means including spring suspension and shock absorbing mechanisms which are particularly designed for the machine forming the broader conception of my invention. A further object is to provide the machine with laterally arranged adjustable side wheels, adapted to be manually raised and lowered, and when in a lowered position are so arranged that they will engage the ground and support the machine in a vertical position, either when the machine is standing still, or when it is moving slowly over the ground, as under such circumstances it is difficult to retain or balance the vehicle in an upright position with the steering wheel, as is done when he machine is moving rapidly over the ground. Still further and more specific objects will be disclosed in the course of the following specification, reference being had to the accompanying drawings, in which:

Figure 1 is a right side elevation of the machine.

Figure 2 is a top or plan view of the machine as shown in Figure 1.

Figure 3 is an enlarged detail sectional plan view as seen substantially on the irregular line 3—3 in Figure 1.

Figure 4 is a sectional elevation about as on the line 4—4 in Figure 1.

Figure 5 is an enlarged detail view, partly in section and with parts broken away, of a portion of the steering mechanism.

Figure 6 is a front elevation of the machine.

Figure 7 is an enlarged detail section showing the hub and spring connection of the front wheel.

Figure 8 is a detail elevation, with some parts removed, of the rear wheel suspension device.

Figure 9 is a plan view of the bracket 38 and spring 40 of the rear suspension, as seen about as on the line 9—9 in Figure 8.

Figure 10 is a plan view of the main frame of the machine, with all other parts removed, the front fork, however, being shown in dotted lines.

Figure 11 is a side elevation of the main frame, as shown in Figure 10.

Figure 12 is a detail view of a rear portion of the machine, as seen from the left, showing an auxiliary seat as secured to the rear fender or guard.

Reference will now be made to the drawings more particularly and by reference characters, like characters referring to like parts throughout the various figures of the drawings.

The main frame, shown particularly in Figures 10 and 11, is cast from any suitably strong and light material, and comprises an upper rail A and a pair of lower rails B—C—D, the forward ends of which converge, meeting the front end of the rail A in an inclined bearing E in which is journaled the fork F for the front wheel G. The rails A and D are further connected by a bridging bar H to form a pocket in which is suitably mounted a fuel tank I. The engine or power unit J is carried and secured to the rails C by bolts K. The rear ends of the rails A and B—C unite with a hollow casing or guard L, in which operates the rear or drive wheel M of the vehicle. This casing includes horizontal bars N which are connected to the rails B by vertical bars O. Immediately above the juncture of the rail A and the guard L is formed a shallow seat P, adapted to contain suitable cushions Q. The forward end of the main frame is provided with a shield R which may be either detachably secured or may be integral with the rails C—D, and has for its object to protect the working parts and operator of the car from dust and dirt.

The front fork F carries the usual mud guard S, and at front and rear points is connected by shackles 15 and 16, to springs 17, which springs are suitably connected to the hub 18 of the wheel G by bracket members 19. The fork F includes upper bars 20 and lower bars 21 which are respectively upwardly and downwardly bowed. These bars are provided with vertically aligned bearings 22 in which are slidably secured a pair of bars 23, the lower ends of which attach to the wheel hubs 18 (see Fig. 7). These bars 23 are rigidly connected at their upper ends, by a member 24, so that they will move up and down simultaneously in the bearings 22, and will thus prevent any lateral tilt or side sway of the wheel G with respect to the fork F. As these bars 23 can only reciprocate in strictly vertical directions it will also be obvious that they will prevent any forward or rearward movement of the wheel with respect to the fork, as might otherwise happen in view of the fact that the springs 17 are connected at both ends to the fork by the links or shackles 15 and 16.

The object of the springs 17 is, of course, to act as the primary spring suspension for the front end of the machine. I have provided additional or auxiliary springs 25 and 26, however, for the purpose of assisting the springs 17, and which also act as shock absorbers to take up the rebound, and thus insuring a smooth, floating action to the fore carriage as the machine travels over the road.

The spindle 27 of the fork F is journaled in the bearing E and is provided at its upper end with a bevel pinion 28. This pinion is secured by lock nuts 29 so that it may be readily adjusted to take up wear or slack.

The pinion 28 meshes with a bevel pinion 30, which is similarly adjustably secured, by nuts 31, on the front end of a horizontal and longitudinally arranged steering shaft 32, the rear end of which has a steering or hand wheel 33. The shaft 32 is preferably housed and journaled in a pipe or sleeve 34, secured in arms 35 which project upwardly from the main frame, and the gears 28 and 30 are preferably protected by a globular housing 36. It may here be noted that the bevel pinions 28 and 30 are both of the same size or diameter. Thus when the driver turns the hand wheel 33, either for steering or balancing purposes, he will impart the same corresponding movement to the wheel G that he would if the hand wheel were on the steering fork F as is customarily the case.

Attention is now directed to the construction of the rear end of the machine.

The rear wheel M has a hub 37 which is carried, at its ends, in a pair of bracket members 38, each of which is slidably mounted on a pair of vertically disposed rods 39, which in turn are rigidly secured at their ends in the main frame members B and N, thus insuring a strictly vertical movement of the wheel M within and with respect to the housing L.

A pair of spring sets 40, one on each side of the car, are rigidly secured at their front ends to the brackets 38, their rear ends being connected by shackles 41 to arms 42 which extend out from and are preferably formed integral with the housing L. This construction comprises the primary suspension means of the rear end of the car from the drive wheel M. To assist in the shock absorbing and rebound take up, however, I provide additional springs 43 and 44, which are coiled about the bars 39 and tend to yieldingly sustain the bracket members 38 in floating intermediate positions between the main frame members B and N.

The wheel M is braked by a brake 45, of any suitable construction, and is driven from the engine or power unit J, as follows. With particular reference to Figure 3 it will be noted that the engine drive shaft 46 has a bevel pinion 47 which meshes with and drives a bevel pinion 48 on a cross shaft 49. The shaft 49 has a second bevel pinion 50 which meshes with and drives a similar pinion 51 on a shaft 52. The rear end of the shaft 52 has a pinion 53 which meshes with and drives a bevel gear 54 on the hub 37 of the wheel M. As the wheel M reciprocates vertically and not on an arc from the shaft 49 it is necessary to provide driving means between the engine and the wheel which will be self-adjusting to accommodate this fluctuating condition. To that end I make the shaft telescopic as at 55 and arrange a protecting sleeve 56, which is also telescopically extensible as at 57, about the shaft. The fore end of this sleeve is carried by a housing 58, about the bevel pinion 50—51, and the rear end is attached to a housing 59, about the gear members 53—54. The housings 58 and 59 are mounted for a slight rocking motion on the respective members 49 and 37, which is essential in order that the driving connection may function properly.

For the purpose of supporting the vehicle in an upright position, either when standing still or when moving slowly over the road, I provide a pair of laterally arranged and relatively small wheels 60, mounted in forked frames 61 which are pivotally secured as at 62 to brackets 63, which in turn are rigidly secured to and carried by the members 38. The wheels 60 are raised and lowered, by the operator, by means of a hand lever 64 which is associated with a rack or segment 65 for holding it in the various positions to which it may be adjusted. The lever is mounted upon and is adapted to rotate or rock a transversely arranged shaft 66, carried by brackets 67 on the main frame. The shaft 66 has a pair of depending arms 78 which are connected by link rods 79—80 to arms 81 of the wheel frames 61, so that the operator may control the height of the wheels 60 by the hand lever 64. The link rods 79—80 are telescoped one into the other and are held projected by springs 82, the telescopic movement being limited by slots and pins 83. This construction prevents any undue strain on the various parts and permits of a limited flexing or yielding movement of the wheels 60 upwardly and rearwardly when they meet with obstructions in the road.

Referring to Figures 1 and 12 it will be noted that the casing or housing L is provided with a rear door 84 which forms a part of the housing and is hinged thereto as indicated at 85. The object of this door is to permit the wheel M to be taken out and replaced, as for instance when a tire is to be changed or repaired. An auxiliary seat 86, is substantially similar in construction to the seat P—Q, except that it is detachable and may be readily attached and detached when so desired. The base of this seat is preferably shaped to conform with the contour of the housing 11, upon which it rests, and is secured thereto by straps 87 which are fastened to the housing as at 88. The seat is also provided with a convenient gripping member 89 by which the occupant of the seat 86 may steady himself when the machine is in motion.

It will, of course, be understood that although the machine has been shown and described as a single unit, it may be connected up with a side car if so desired and for this purpose I have provided convenient fastening holes 90. In this event, there would be no need for the side wheel mechanism and it could either be removed, or left in an idle or raised position.

It is further understood that various modifications may be made in the general design and structural details of the invention as herein illustrated and described, providing, however, that such modifications come within the spirit and scope of the appended claims.

Having now, therefore, fully shown and described my invention, what I claim to be new and desire to protect by Letters Patent is:—

1. A motorcycle having in combination, a frame, a wheel having an axle disposed in said frame, said frame having portions at each side of said wheel, a pair of rods secured in each of said portions, one at each side of said axle, a pair of springs surrounding each of said rods and a member supported by said axle disposed between the springs of each pair and a leaf spring connected to said member and co-operating with said first mentioned springs.

2. The structure set forth in claim 1, one of said springs being a compression spring and the other being a tension spring, the latter having one end secured to said frame and its other end secured to said last mentioned member.

3. A motorcycle having in combination, a frame, a wheel mounted therein having an axle, a bracket supported at each end of said axle, a leaf spring secured in each of said brackets, a shackle connecting the end of said leaf spring to said frame, means for guiding said frame in a vertical direction when said springs are flexed, auxiliary springs for supporting said frame and auxiliary springs resisting upward movement of said frame relatively to said axle.

4. A motorcycle having in combination, a frame, a wheel mounted therein having an axle, a bracket at each end of said axle, each of said brackets having a channel therein open at its outer side, a leaf spring having its rigid portion disposed in said channel, plates spanning the sides of said channel and bolted thereto for holding said spring in place, means for flexibly connecting the end of said spring to said frame and springs engaging said bracket and disposed at each side of said axle.

5. A motorcycle having in combination, a frame, a wheel mounted therein having an axle, a bracket at each end of said axle, each of said brackets having a channel therein open at its outer side, a leaf spring having its rigid portion disposed in said channel, plates spanning the sides of said channel and bolted thereto for holding said spring in place, means for flexibly connecting the end of said spring to said frame, and a screw threaded into the top of said bracket for engaging said leaf spring for holding the same against endwise movement.

6. A motorcycle having in combination, a frame, a wheel disposed in said frame having an axle, said frame having portions at each side of said wheel, a member at each side of said wheel supported on said axle, and reversely acting springs above and below said frame, one of said springs being disposed between said bearings and one above said upper bearing portion engaging the same and supported by said member for yieldingly supporting said frame.

7. A motorcycle having in combination, a frame, a wheel disposed in said frame having an axle, said frame having portions at each side of said wheel, a member at each side of said wheel supported on said axle, rearwardly extending leaf springs supported at each end of said axle, means for flexibly connecting said leaf springs to said frame and reversely acting coil springs supported from said axle for additionally supporting said frame.

8. A motorcycle having in combination, a frame, a wheel supported therein having an axle, said frame having portions at each side of said wheel, a vertical rod mounted in each of said portions, said rods being held in rigid relation, reversely acting springs on said rods for supporting said frame, and additional springs at each side of said wheel respectively connected to said portions.

9. In a motorcycle, a frame, a front steering wheel and a rear drive wheel supporting the frame, two pair of vertical bars rigidly secured in the frame, one pair on each side of the drive wheel, bracket members slidably secured one on each pair of said bars, said brackets being carried by the drive wheel axles, and shock absorbing springs associated with said brackets.

10. In a motorcycle having a frame including a rear housing, a wheel in said housing, vertical guides rigidly secured to each side of the housing, bracket members at the ends of the wheel axle for sliding movement on said guides, main springs for suspending the housing from said bracket members, and coiled springs on said guides above and below said bracket members.

11. In a motorcycle having a frame including a rear housing, a driving wheel in said housing, vertical guides rigidly secured to each side of the housing, bracket members at the ends of the wheel axle for sliding movement on said guides, main springs for suspending the housing from said bracket members, and auxiliary shock absorbing springs above and below said bracket members for retaining said brackets in a yielding normal position on said guides.

12. In a motorcycle having a frame including a rear housing, a driving wheel in said housing, vertical guides rigidly secured to each side of the housing at the front and rear of the wheel axle, bracket members at the ends of the wheel axle for sliding movement on said guides, main springs for suspending the housing from said bracket members, and auxiliary springs being coiled about the guides and acting in opposite directions against the bracket members.

13. A motorcycle having in combination, a frame, a wheel mounted therein, said frame having portions disposed at each side of said wheel, each of said portions having a vertical rod carried in guides therein, coiled springs on said guides, a pair of springs surrounding each of said rods for yieldingly supporting said frame, one of the springs of each of said pairs being a compression spring and the other being a tension spring.

14. A motorcycle having a frame including a rear wheel housing, a wheel in said housing, vertical guides rigidly secured to each side of the housing, bracket members at the ends of the wheel axle for sliding movements on said guides, a leaf spring secured at one end to each of said brackets and extending rearwardly therefrom, a bracket at the rear of said housing at each side thereof, and shackles respectively connecting said last mentioned brackets and the other ends of said leaf springs.

15. A motorcycle having in combination, a frame, a wheel disposed therein, said frame having portions straddling said wheel, springs at the side of said wheel and carried thereby, said springs being flexibly connected at their ends to said frame portions respectively, a pair of additional springs at each side of said wheel, one spring of each pair being disposed above one of said portions and resisting upward movement of said frame, and the other spring of each pair being disposed below said portion and resisting downward movement of said frame relatively to said wheel.

16. A motorcycle having in combination, a frame, a wheel disposed therein, said frame having portions straddling said wheel, said portions having spaced vertically alined openings, a rod extending through said openings and portions, a pair of springs on said rod above and below one of said portions, and a leaf spring co-operating with said springs in the relative movement of said wheel and frame.

17. A motorcycle having in combination, a frame, a wheel mounted therein, said frame having portions disposed at each side of said wheel, each of said portions having a vertical rod carried therein and extending therethrough, a pair of springs surrounding each of said rods for yieldingly supporting said frame, the same being disposed above and below one of said portions respectively, and an additional spring at each side of said wheel secured to each of said portions.

18. A motorcycle having in combination, a frame, a wheel mounted therein having an axle, a bracket supported at each end of said axle, a leaf spring secured in each of said brackets, a shackle connecting the end of each leaf spring to said frame, a pair of rods supported in said frame at each end of said axle, one of the rods of each pair disposed at either side of the axle, springs disposed on said rods whereby there is a pair of springs above and below each of said brackets and acting thereon.

19. A motorcycle having in combination, a frame, a wheel mounted therein, said frame having portions disposed at each side of said wheel, each of said portions having a vertical rod carried in guides therein, a pair of springs surrounding each of said rods for yieldingly supporting said frame, one of the springs of each of said pairs being a compression spring and the other being a tension spring, one end of each spring being engaged by the frame portions and the other ends of said springs being held stationary relatively to the axis of said wheel.

In testimony whereof I affix my signature.

ANDREW DURESEN.